(12) United States Patent
Haddock

(10) Patent No.: US 9,767,841 B2
(45) Date of Patent: *Sep. 19, 2017

(54) WRITE ENCROACHMENT MITIGATION SYSTEM

(71) Applicant: Seagate Technology LLC, Cupertino, CA (US)

(72) Inventor: Quinn J. Haddock, Provo, UT (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,394

(22) Filed: Sep. 6, 2016

(65) Prior Publication Data

US 2016/0379680 A1 Dec. 29, 2016

Related U.S. Application Data

(63) Continuation of application No. 14/719,052, filed on May 21, 2015, now Pat. No. 9,437,240.

(51) Int. Cl.
*G11B 21/02* (2006.01)
*G11B 20/10* (2006.01)
*G06F 3/06* (2006.01)

(52) U.S. Cl.
CPC ...... *G11B 20/10212* (2013.01); *G06F 3/0619* (2013.01); *G06F 3/0653* (2013.01); *G06F 3/0656* (2013.01); *G06F 3/0676* (2013.01)

(58) Field of Classification Search
None
See application file for complete search history.

(56) References Cited

U.S. PATENT DOCUMENTS

| | | | |
|---|---|---|---|
| 7,423,828 B2 | 9/2008 | Emo et al. | |
| 8,625,215 B1 | 1/2014 | Burd et al. | |
| 8,755,142 B2 | 6/2014 | Grobis et al. | |
| 8,854,751 B2 | 10/2014 | Rub | |
| 9,129,658 B1 | 9/2015 | Yamamoto | |
| 9,437,240 B1* | 9/2016 | Haddock | G11B 20/10212 |
| 2003/0112545 A1 | 6/2003 | Hanson et al. | |

* cited by examiner

*Primary Examiner* — K. Wong
(74) *Attorney, Agent, or Firm* — Holzer Patel Drennan

(57) ABSTRACT

The disclosed technology provides for a method and system comprising determining a write-encroachment threshold of a recording medium, determining a track as off-track and one or more tracks substantially near the off-track as unwriteable, flagging the one or more tracks substantially near the off-track track, and writing write data for the one or more flagged tracks to a media cache. In a recovery process, the write data can be later transferred back to the flagged tracks.

20 Claims, 5 Drawing Sheets

WRITE ENCROACHMENT MITIGATION SYSTEM

PRIORITY CLAIM

This application claims priority to U.S. application Ser. No. 14/719,052 filed May 21, 2015, the entire disclosure of which are incorporated herein by reference for all purposes.

SUMMARY

The disclosed technology provides a write encroachment threshold and track flagging system. Specifically, disclosed methods and system include determining a write-encroachment threshold of a recording medium, determining a track as off-track and one or more tracks substantially near the off-track as unwriteable, flagging the one or more tracks substantially near the off-track track, and writing write data for the one or more flagged tracks to a media cache. In a recovery process, the write data can be later transferred back to the flagged tracks.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Descriptions of various implementations as further illustrated in the accompanying drawings and defined in the appended claims.

These and various other features and advantages will be apparent from a reading of the following detailed description.

BRIEF DESCRIPTION OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

Data storage devices are used to access data in a fast and efficient manner. Some types of data storage devices use rotatable storage media, along with one or more data transducers that write data to and subsequently read data from tracks defined on the media surfaces.

When writing data to a particular track, transducer position is often monitored and the writing operation is temporarily suspended if a write fault threshold (WFT) is exceeded. For example, such a WFT may be equal to the OCLim (On Cylinder Limit) of the disc drive, where the OCLim is set to a predefined percentage of the nominal track pitch for the disc drive. Halting the ting operation reduces the likelihood that the data written to the track will encroach upon, and hence interfere with, data written to an adjacent track.

The disclosed technology provides for a write encroachment threshold (WET), a second threshold, to prevent encroachment in data tracks in storage media. Specifically, the implementations disclosed herein provide for determining the WET of a recording medium based on the position error signal (PES). For example, the WET may be determined to be higher than the normal PES levels but below the WFT. When the WET is exceeded for a given data track, that track is flagged as an "off-track" and the tracks adjacent to that "off-track" are determined to be unwriteable. The unwriteable tracks are flagged and any data to be written to the flagged unwriteable tracks is re-directed to a media cache to avoid encroachment.

Any time that a write is requested to one of the flagged tracks, the write will instead be directed to the media cache. A WET recovery process transfers the data from the media cache back to the main storage, or flagged tracks, and the flags can be cleared from the flagged tracks. The disclosed technology prevents single-sided and dual-sided encroachment for drives, which are generally stressed for areal density capability.

Figure 1:
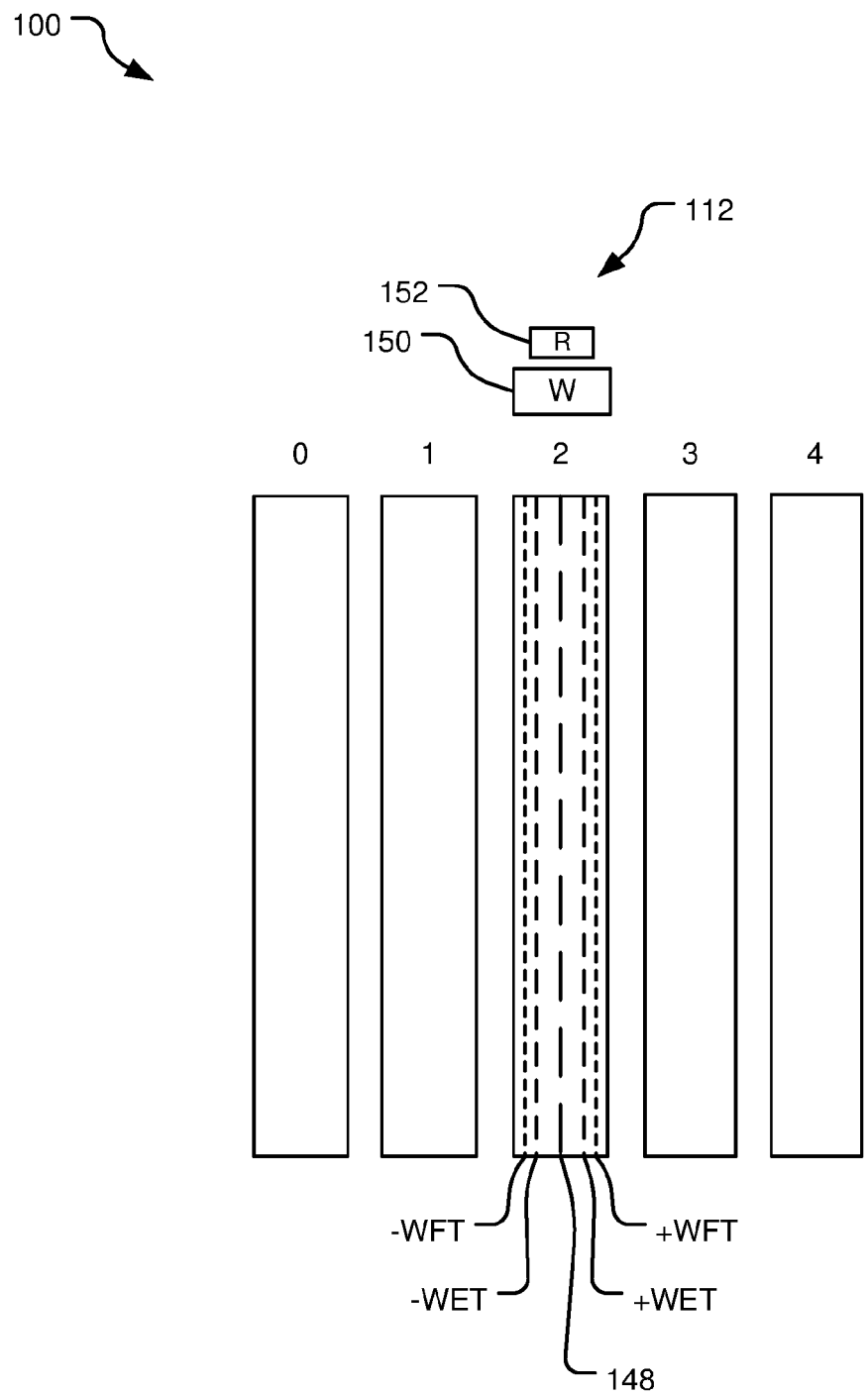
FIG. 1 illustrates example adjacent data tracks with a WET in a recording medium.

FIG. 1 shows five example adjacent tracks arbitrarily denoted as Tracks 0-4. A selected transducer 112 is shown nominally aligned with Track 2. The transducer 112 is contemplated as having a giant magneto-resistive (GMR) construction with separate inductive write element 150 and MR read element 152. However, alternative transducer structures, such as a TMR transducer, etc., may also be used. Each of these elements has an associated operational width, which may or may not be the same as the corresponding physical width of the element.

While the write and read elements 150, 152 are shown to be radially aligned in FIG. 1, it will be understood that a number of factors, such as head construction and actuator skew angle, will generally tend to place the respective elements at locations that are different from that shown in FIG. 1. During a write operation a servo circuit (not shown) will generally attempt to obtain a desired alignment of the write element 150 with the selected track (such as the centered alignment of FIG. 1), and the read element 152 may in fact be aligned somewhere else (including aligned with a different track).

Similarly, during a subsequent read operation the read element 152 may generally be aligned by the servo circuit with the associated track such as shown in FIG. 1, irrespective of the location of the write element 150. Since the read element 152 serves as the sensor for both read and write operations, a servo processor (not shown) uses tables or formulae to determine the necessary offsets for these respective read and write elements.

During a data write operation to Track 2, the servo circuit will generally attempt to maintain the write element 150 along the associated centerline 148 (or other reference point) of Track 2. For illustrative purposes, a pair of opposing, write fault thresholds +WFT and −WFT, which define a maximum allowable deviation from the centerline (or other reference point) during the write operation, are shown in FIG. 1. Values for the WFTs may be based on the track width or the nominal track pitch of the tracks. For example, example values of WFT may on the order of ±13-15% of the or nominal track pitch of data tracks.

Generally, if a positional error of the transducer 112 exceeds a corresponding +WFT or −WFT, a write fault condition is declared and the write operation to the associated track is temporarily suspended. This reduces the likelihood that the writing of data to a selected track, such as Track 2, will result in the overlapping of data previously written to an adjacent track, such as Track 1 or Track 3. The write will be stopped and retried on the off-track Track 2 until it is stable within the WFT. As a result, halting the write impacts performance.

With reference again to the respective write and read elements 150, 152, it will be noted that the read element 152 may have an effective operation width that is less than the associated effective operational width of the write element 150. In such a case, the overlapping of data on one track by data written to an adjacent track may not present a significant problem in recovering the data to the overwritten track. This can be true even if the amount of overlap is greater than the WFT.

However, this may not necessarily be the case if the overlapped track is overlapped, or encroached, from two directions (i.e., on both sides). If a given track is partially overwritten by both of the immediately adjacent tracks on either side of the given track, there may be insufficient signal strength in the remaining data on the center track to permit successful recovery of the data.

The disclosed technology mitigates single-sided and dual-sided write encroachment of recording tracks with a second, lower threshold than the WFT, referred to as write encroachment threshold (WET). The WET for a storage media may also be defined as percentage of the nominal track pitch or width of tracks. Typically the WET is defined to be a lower percentage of the nominal track pitch or width of tracks compared to the percentage used to define the WFT. For example, FIG. 1 illustrates a +WET and a −WET, each of which is lower than the +WFT and a −WFT. Exemplary values for the WETs may be on the order of ±8-10% of the track width, which is a lower threshold than the WFT. The WET can be, for example, between normal PES levels and on-cylinder limit (OCLIM) or the WFT. Determining the WET includes monitoring not just PES as in WFT, but monitoring maximum and minimum PES during the write operation.

After determining the WET, the method disclosed herein provides for monitoring the PES during a write operation. If it is determined that based on the observed PES that the PES level is above +WET or below −WET but below +WFT and above −WFT (i.e., in the range below the WET and WFT), rather than halting writing (as when the PES levels exceed the WFT), the track is flagged as "off-track." Furthermore, one or more of tracks adjacent to the off-track are flagged as unwritable track (UT) or encroached track (ET) (further described in detail in FIGS. 2, 4, and 5).

Even though the higher WFT is not reached, such directional flagging in response to the PES being above the WET prevents neighboring tracks from being squeezed, reducing the probability of encroached tracks. Subsequent to the flagging, write requests are temporarily redirected to a media cache on the disc or other non-volatile memory (e.g., Flash). Thus, for example, if Track 3 was flagged as an ET and Track 4 is tracked as UT, the data directed to Tracks 3 and 4 is stored in the media cache. Such data written to the UT and ET may be recovered during disc idle time from the media cache and written in sequence on the flagged tracks. Directing the data writes from the UT and ET to the media cache mitigates potential encroachment on these flagged tracks. By mitigating encroachment, the disclosed processes allow for safe re-read and writing of data to be performed during transfer from the media cache to the main storage, or data tracks.

Figure 2:
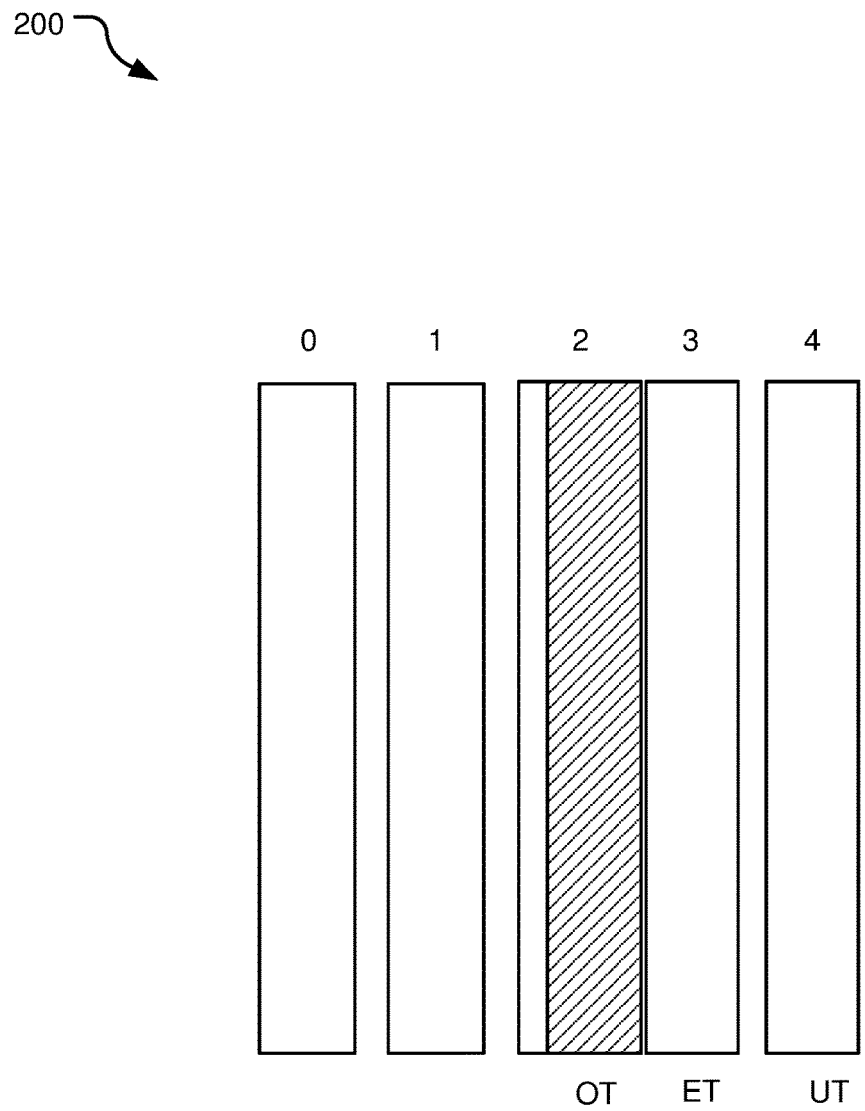
FIG. 2 illustrates example adjacent data tracks with a +WET exceeded in a recording medium.

FIG. 2 shows five example adjacent tracks arbitrarily denoted as Tracks 0-4. As shown, +WET (the threshold in the direction of the outer diameter (OD) of the recording medium) is exceeded on track 2 (as shown by the cross-hatched portion on track 2). Track 2 is flagged as an "off-track" or "OT". The track adjacent to the OT in the direction of the OD (Track 3) will be flagged as an "encroached track" or "ET". A track adjacent to the ET (Track 4) will be flagged as an "unwriteable track" or "UT". Both the ET and the UT will be flagged as unwriteable. In one implementation, a storage controller stores information about the flagged tracks in a table that can be stored in a memory, such as a fast memory accessible by the storage controller.

Upon receiving write requests, any data to be written to the flagged unwriteable tracks ET and UT is re-directed to media cache to avoid excessive single-sided squeeze or dual-sided squeeze. The storage controller may also store information about location of the data in the media cache to the table storing information about the flagged tracks. Thus, for example, a mapping of the flagged tracks to the location in the media cache may be stored. Subsequently, a recovery process (described in detail in FIG. 5) transfers the data from the media cache back to the flagged tracks on the main storage during idle time, when the media cache is full, etc.

Figure 3:
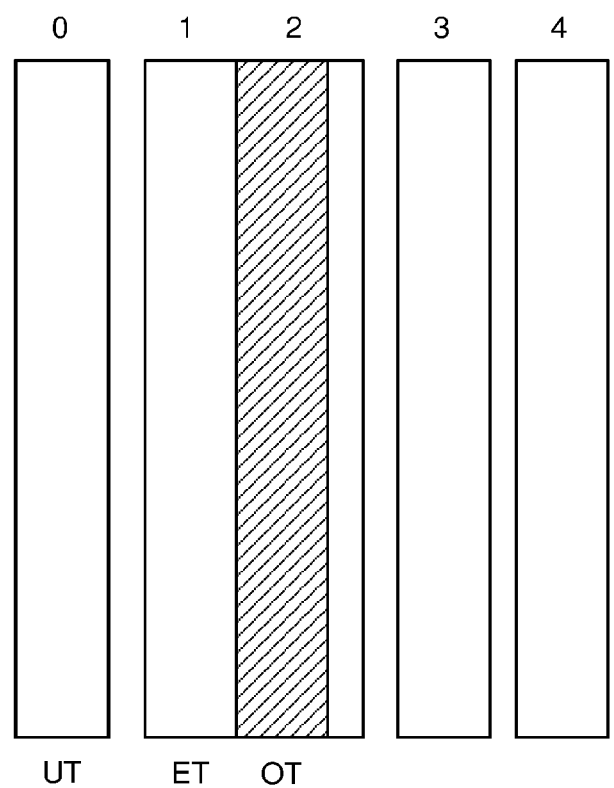
FIG. 3 illustrates example adjacent data tracks with a −WET exceeded in a recording medium.

FIG. 3 illustrates five example adjacent tracks arbitrarily denoted as Tracks 0-4 with exemplary values for +/−WETs, which can be, for example, on the order of ±8-10% of the track width. In FIG. 3, −WET (the threshold in the direction of the inner diameter (ID) of the recording medium is exceeded for track 2. Track 2 is flagged as an "off-track" or "OT." The track adjacent to the OT in the direction of the ID (Track 3) will be flagged as an "encroached track" or "ET". A track adjacent to the ET (Track 4) will be flagged as an "unwriteable track" or "UT". Both the ET and the UT will be flagged as temporarily unwriteable. Upon a write request, any data to be written to the flagged tracks is re-directed to media cache to avoid excessive single-sided squeeze or dual-sided squeeze.

A recovery process (described in detail in FIG. 5) transfers the data from the media cache back to the flagged tracks on the main storage during idle time, when the media cache is full, etc.

Figure 4:
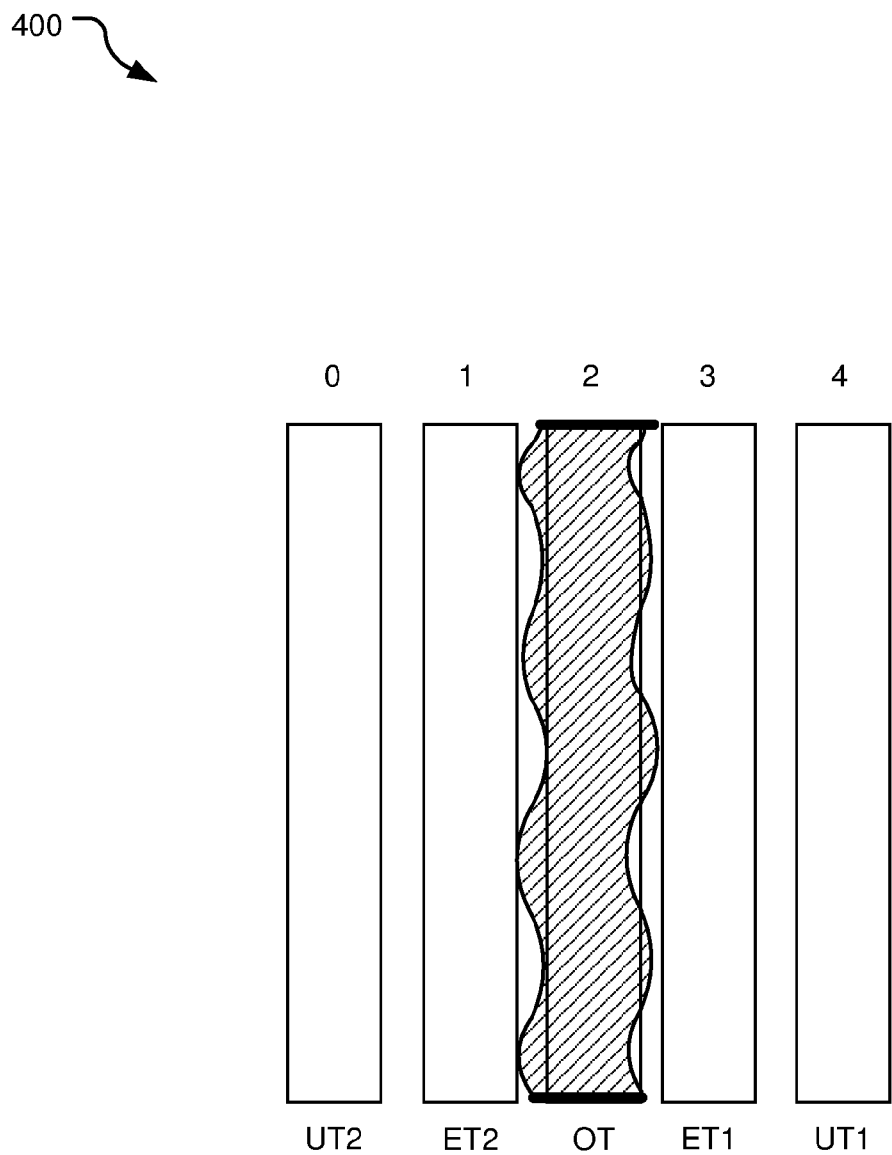
FIG. 4 illustrates example adjacent data tracks with both a +WET and −WET exceeded in a recording medium.

FIG. 4 shows five example adjacent tracks arbitrarily denoted as Tracks 0-4. Both +WET (the threshold in the direction of the OD of the recording medium) and −WET (the threshold in the direction of the ID of the recording medium) is exceeded on track 2 (as shown by the cross-hatched portion on track 2). Track 2 is flagged as "off-track" or "OT". The two tracks adjacent to the OT in the direction of the OD and the ID (Tracks 3 and 4) are flagged as "encroached tracks" or "ET1" and "ET2".

Tracks adjacent to ET1 and ET2, shown here as tracks 1 and 3, will be unwriteable tracks (flagged as "UT1" and "UT2"). The tracks ET1, ET2, UT1, and UT2 will all be flagged as unwriteable. Upon write requests, any data to be written to the flagged unwriteable tracks ET1, ET2, UT1, and UT2 is re-directed to media cache to avoid excessive single-sided squeeze or dual-sided squeeze.

A recovery process (described in detail in FIG. 5) transfers the data from the media cache back to the flagged tracks on the main storage during idle time, when the media cache is full, etc.

Figure 5:
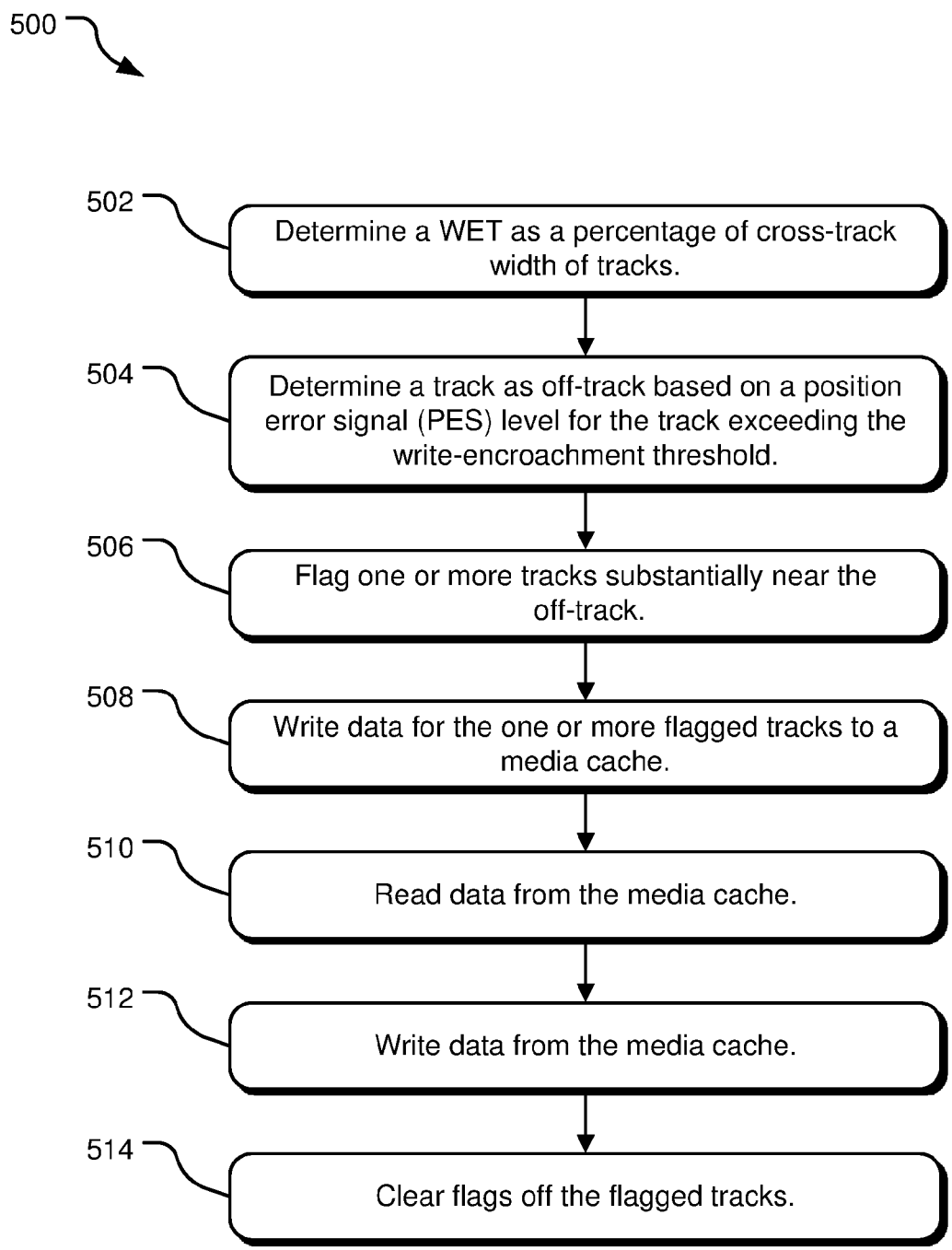
FIG. 5 illustrates example operations for a WET recovery process.

FIG. 5 shows example operations 500 for the disclosed write encroachment recovery process. In one implementation, a storage device may include a memory configured to store data on the data tracks, and a processor is configured to perform the example operations 500.

As shown, an operation 502 determines a WET as a percentage of cross-track width of tracks. For example, exemplars, values for the WET may be on the order of ±8-10% of the track width in either direction.

An operation 504 determines a track as off-track based on a PES level for the track exceeding the write-encroachment threshold and flags the track as off-track or OT. Operation 506 flags one or more tracks substantially near the off-track. For example, the track adjacent to the OT in FIG. 2 is flagged as an encroached track or ET. Similarly, the track adjacent to the ET is flagged as an unwriteable track or UT. Both the ET and UT are unwriteable.

Operation 508 writes data for the one or more flagged tracks to a media cache. The data is re-directed to the media cache to avoid single-sided or dual-sided encroachment. To transfer the data back to the flagged tracks when they are no longer encroached within the limits of the WET or when the media cache is full, operation 510 reads data and operation 512 writes data.

The order of read/write (R/W) operations 510 and 512 can vary depending on the direction(s) the WET(s) are exceeded, and the data for each track can be R/W individually or all the data can be read together and then written together. For example, where +WET is exceeded, (as shown in FIG. 2), the data for the OT can be re-read from the main storage, and the data for the ET is read from the media cache. Then, operation 512 writes the data from the OT and ET sequentially. Or, in another implementation, the R/W of the data for the flagged tracks occurs by R/W select tracks individually (e.g., R/W OT, then R/W ET). Then, flags on the flagged tracks are cleared in an operation 514. Subsequently, write requests will be directed to the tracks and no longer to the media cache.

In an implementation (described in detail in FIG. 3), where −WET is exceeded, data is transferred from the media cache back to the main storage, or to the flagged tracks, in operations 510 and 512 when there is no longer encroachment exceeding the −WET or when the media cache is full. The R/W operations 510 and 512 occur in the opposite direction from where +WET is exceeded (e.g., read ET and OT, write ET and OT). In other words, +/−WET may be asymmetrical with the preferred write direction. The reading and writing occurs from the OD to the ID in most mediums, but in SMR the direction of reads and writes can vary by zone.

For example, when transferring the data back to the flagged tracks when they are no longer encroached within the limits of the −WET or when the media cache is full, the R/W of the data for the flagged tracks from the media cache can occur either by R/W of select tracks individually (e.g., R/W ET, then R/W OT for the implementation in FIG. 3). Or, in another implementation, if there is enough time and buffer, all of the data can be read and all of the data can be written sequentially (e.g., read ET and OT, write ET and OT). Then, flags are cleared in operation 514. Subsequently, write requests will be directed to the tracks and no longer to the media cache.

In an implementation (described in detail in FIG. 4), where +WET and −WET are exceeded, R/W operations 510 and 512 transfer data from the media cache back to the main storage, or to the flagged tracks, when there is no longer encroachment exceeding the +/−WET or when the media cache is full. The R/W operations 510 and 512 for the flagged tracks from the media cache can again occur either by R/W of select tracks individually (e.g., R/W ET2, R/W OT, R/W UT2, R/W ET1, in FIG. 4). In another implementation, some data can be R/W together and other data R/W individually (e.g., R/W ET2 and OT, then R/W UT2, and R/W ET1, in FIG. 4). Or, in another implementation, if there is enough time and buffer, all of the data can be read and all of the data can be written sequentially and the flags cleared. Once the data is read and written on the flagged data tracks, operation 514 clears flags off the flagged tracks. Subsequently, write requests will be directed to the tracks and no longer to the media cache.

The implementations described herein may be implemented as logical steps in one or more computer systems. The logical operations of the various implementations described herein are implemented (1) as a sequence of processor-implemented steps executing in one or more computer systems and (2) as an interconnected machine or circuit modules within one or more computer systems. The implementation is a matter of choice, dependent on the performance requirements of the computer system. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   determining a write-encroachment threshold (WET) of a recording medium;
   determining a track as off-track and one or more tracks substantially near the off-track as unwriteable;
   flagging the one or more tracks substantially near the off-track track; and
   writing write data for the one or more flagged tracks to a media cache.

2. The method of claim 1, wherein determining a WET of a recording medium as a percentage of cross-track width of tracks in the recording medium.

3. The method of claim 1, wherein determining a track as off-track and one or more tracks substantially near the off-track as unwriteable is based on a position error signal level for the track exceeding the WET.

4. The method of claim 1, further comprising transferring the write data from the media cache back to the flagged tracks when the media cache is full.

5. The method of claim 1, wherein transferring the data from the media cache back to the flagged tracks further comprises reading all the data from the media cache and then writing the data from the media cache sequentially.

6. The method of claim 5, further comprising clearing flags on the flagged tracks after the transferring operation.

7. The method of claim 1, wherein the flagged tracks are adjacent to the off-track in the direction of the outer diameter of the recording medium.

8. The method of claim 1, wherein the flagged tracks are adjacent to the off-track in the direction of the inner diameter of the recording medium.

9. The method of claim 1, wherein the flagged tracks are adjacent to the off-track in the direction of the inner diameter and adjacent to the off-track in the direction of the inner diameter of the recording medium.

10. A storage device system, comprising:
a memory configured to store data on data tracks; and
a processor configured to determine a write-encroachment threshold (WET) of a recording, determine a track as off-track and one or more tracks substantially near the off-track as unwriteable, flag the one or more tracks substantially near the off-track track, and write write data for the one or more flagged tracks to a media cache.

11. The storage device of claim 10, wherein determining a WET of a recording medium as a percentage of cross-track width of tracks in the recording medium.

12. The storage device of claim 10, wherein determining a track as off-track and one or more tracks substantially near the off-track as unwriteable based on a position error signal level for the track exceeding the WET.

13. The storage device of claim 10, wherein the processor is further configured to write requests to the media cache when a write request is made to the flagged tracks.

14. The storage device of claim 13, wherein the processor is further configured to transfer the data from the media cache to the flagged tracks when the media cache is full.

15. The storage device of claim 14, wherein the processor is further configured to read data from the media cache and then write the data from the flagged tracks from the media cache sequentially.

16. The storage device of claim 15, wherein the processor is further configured to clear flags on the flagged data tracks when the data is written on the flagged tracks.

17. A method comprising:
determining a write-encroachment threshold (WET) of a recording medium;
determining a track as off-track and one or more tracks substantially near the off-track as unwriteable;
flagging the one or more tracks substantially near the off-track track;
writing write data for the one or more flagged tracks to a media cache; and
determining a +WET and a −WET and determining off-track tracks exceeding the +WET and the −WET.

18. The method of claim 17, further comprising determining a write-encroachment threshold (WET) of a recording medium as a percentage of cross-track width of tracks in the recording medium and determining a track as off-track and one or more tracks substantially near the off-track as unwriteable is based on a position error signal level for the track exceeding the WET.

19. The method of claim 17, further comprising re-reading data for the off-track track from a main storage and reading data for the one or more unwriteable tracks from the media cache if the +WET is exceeded, and writing the data from the off-track track and one or more unwriteable tracks sequentially.

20. The method of claim 17, further comprising transferring data from the media cache back to the flagged tracks if −WET is exceeded and the cache is full.

* * * * *